US009951550B2

(12) United States Patent
Mccafferty

(10) Patent No.: US 9,951,550 B2
(45) Date of Patent: Apr. 24, 2018

(54) AUTOMATED TELLER MACHINE (ATM) HAVING A SIDECAR AND METHODS OF SUPPORTING AN ATM HAVING A SIDECAR

(71) Applicant: NCR Corporation, Duluth, GA (US)

(72) Inventor: Liam Mccafferty, Angus (GB)

(73) Assignee: NCR Corporation, Atlanta, GA (US)

(*) Notice: Subject to any disclaimer, the term of this patent is extended or adjusted under 35 U.S.C. 154(b) by 364 days.

(21) Appl. No.: 13/873,963

(22) Filed: Apr. 30, 2013

(65) Prior Publication Data

US 2014/0318425 A1 Oct. 30, 2014

(51) Int. Cl.
*G06Q 40/00* (2012.01)
*E05G 1/02* (2006.01)

(52) U.S. Cl.
CPC .................................... *E05G 1/02* (2013.01)

(58) Field of Classification Search
CPC ....... G07F 19/20; G07F 19/205; G07F 19/201
USPC .......................................................... 235/379
See application file for complete search history.

(56) References Cited

U.S. PATENT DOCUMENTS

| | | | | |
|---|---|---|---|---|
| 5,497,708 A * | 3/1996 | Jeruzal | B65D 19/44 | 108/54.1 |
| 6,222,134 B1 * | 4/2001 | Aoyama | H01B 17/16 | 174/158 F |
| 6,276,602 B1 * | 8/2001 | Henderson et al. | 235/379 | |
| 2007/0246524 A1 * | 10/2007 | Booth et al. | 235/379 | |
| 2012/0160137 A1 * | 6/2012 | Linares | B65D 19/0026 | 108/57.12 |
| 2012/0186086 A1 * | 7/2012 | Tavares De Pinho | E05G 1/024 | 29/897.34 |

* cited by examiner

*Primary Examiner* — Thien M Le
*Assistant Examiner* — Tae Kim
(74) *Attorney, Agent, or Firm* — Michael Chan; Paul W. Martin

(57) ABSTRACT

An automated teller machine (ATM) comprises a safe enclosure in which ATM modules which require a relatively higher security level are housed. The ATM further comprises a first standard enclosure housing attached to a first side of the ATM, and in which ATM modules which require a relatively lower security level are housed. The ATM also comprises a support plate secured to bottom of the safe enclosure and to bottom of the first standard enclosure housing to structurally support both the safe enclosure and the first standard enclosure housing as a unit when the ATM is lifted and thereby to allow the ATM to be lifted without applying force to the first standard enclosure housing and thereby to prevent damage to the first standard enclosure housing.

10 Claims, 5 Drawing Sheets

AUTOMATED TELLER MACHINE (ATM) HAVING A SIDECAR AND METHODS OF SUPPORTING AN ATM HAVING A SIDECAR

BACKGROUND

The present application relates to automated teller machines, and is particularly directed to an automated teller machine (ATM) having a sidecar and methods of supporting an ATM having a sidecar.

A typical ATM having a sidecar includes a safe enclosure and a standard enclosure housing (i.e., the sidecar) which is mounted to a side of the safe enclosure. The safe enclosure generally houses ATM modules which require a relatively higher security level, such as a bank note container or dispenser, for examples. The standard enclosure housing generally houses ATM modules which require a relatively lower security level, such as a printer or a coin module, for examples. The safe enclosure is structural, whereas the standard enclosure housing is non-structural. Accordingly, the safe enclosure provides the structural rigidity and strength needed for lifting, moving, and installing the ATM having the sidecar.

An ATM having a sidecar provides limited access to lifting by a fork of a forklift truck since the forklift should only approach the ATM from a side in which no sidecar is mounted so as to prevent damage to the sidecar. For an ATM having only one sidecar, a forklift truck should only approach the ATM unit from one of three sides (i.e., from the front, the back, or the side opposite to the side on which the sidecar is mounted). For an ATM having two sidecars, a forklift truck should only approach the ATM unit from one of two sides (i.e., from the front or the back). It would be desirable to provide an ATM having at least one sidecar with sufficient structural rigidity and strength to allow the ATM unit to be lifted by a forklift truck from any side without applying any force to sidecars.

SUMMARY

In accordance with one embodiment, an automated teller machine (ATM) comprises a safe enclosure in which ATM modules which require a relatively higher security level are housed, a first standard enclosure housing attached to a first side of the ATM, and in which ATM modules which require a relatively lower security level are housed, and a support plate secured to bottom of the safe enclosure and to bottom of the first standard enclosure housing to structurally support both the safe enclosure and the first standard enclosure housing as a unit when the ATM is lifted and thereby to allow the ATM to be lifted without applying force to the first standard enclosure housing and thereby to prevent damage to the first standard enclosure housing.

In accordance with another embodiment, a method is provided of supporting an automated teller machine (ATM) having a safe enclosure and a first standard enclosure housing. The method comprises supporting bottom of the safe enclosure and bottom of the first standard enclosure housing with a single structural support plate which is secured to bottom of the safe enclosure to provide rigidity and strength to the safe enclosure and the first standard enclosure housing and thereby to enable the first standard enclosure housing to be lifted together with the safe enclosure as a unit when the ATM is lifted by a forklift.

In accordance with yet another embodiment, an automated teller machine (ATM) comprises a safe enclosure in which ATM modules which require a relatively higher security level are housed, a first standard enclosure housing attached to a first side of the ATM, and in which ATM modules which require a relatively lower security level are housed, and a second standard enclosure housing attached to a second side of the ATM which is opposite the first side of the ATM, and in which ATM modules which require a relatively lower security level are housed. The ATM further comprises a support plate secured to bottom of the safe enclosure, bottom of the first standard enclosure housing, and bottom of the second standard enclosure housing to structurally support the safe enclosure and the first and second standard enclosure housings as a unit when the ATM is lifted and thereby to allow the ATM to be lifted without applying force to the first and second standard enclosure housings and thereby to prevent damage to the first and second standard enclosure housings.

DETAILED DESCRIPTION

The present application is particularly directed to an automated teller machine (ATM) having a sidecar and methods of supporting an ATM having a sidecar.

Figure 1:
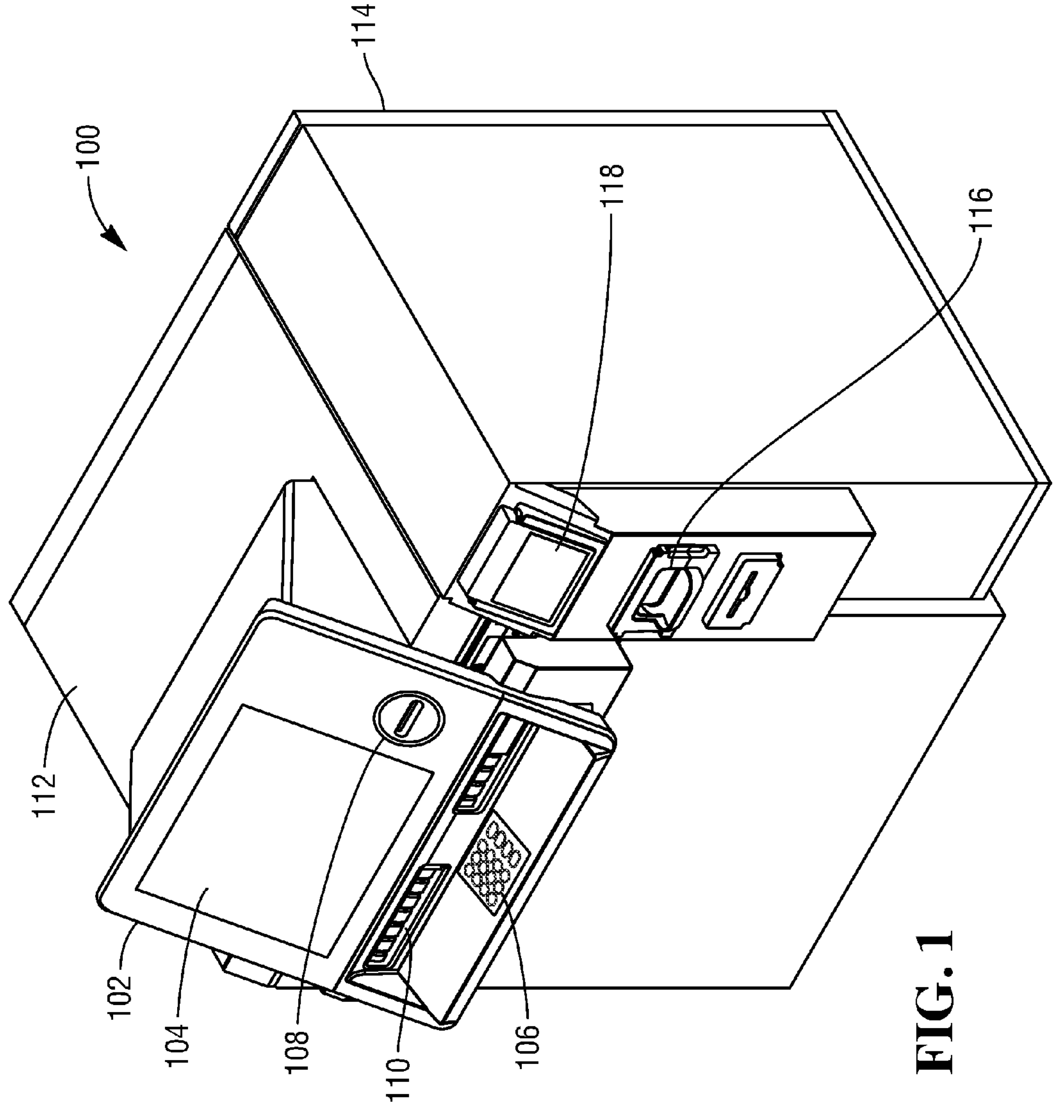
FIG. 1 is a perspective view of an ATM having a safe enclosure and one sidecar, and constructed in accordance with one embodiment.

Referring to FIG. 1, an ATM 100 comprises a user interface 102 including a screen 104, a keypad 106, a card reader 108, and a media dispenser 110. Respective modules for these components are housed in a safe enclosure housing 112 of ATM 100. Additional functionality is provided by way of an additional module housed in a standard enclosure housing 114 (i.e., a sidecar) mounted to the right-hand side of safe enclosure housing 112. Sidecar 114 of ATM 100 is mounted in a front facing configuration with respect to user interface 102. The additional module housed in sidecar 114 includes a receipt printing device 116 and a screen 118. The additional module may include one or more of other such modules including, for example, a controller module, a customer display and/or keypad, a card read/write module, a printer module, a cash dispenser module, a journal printer module, and an operator panel module.

Figure 2:
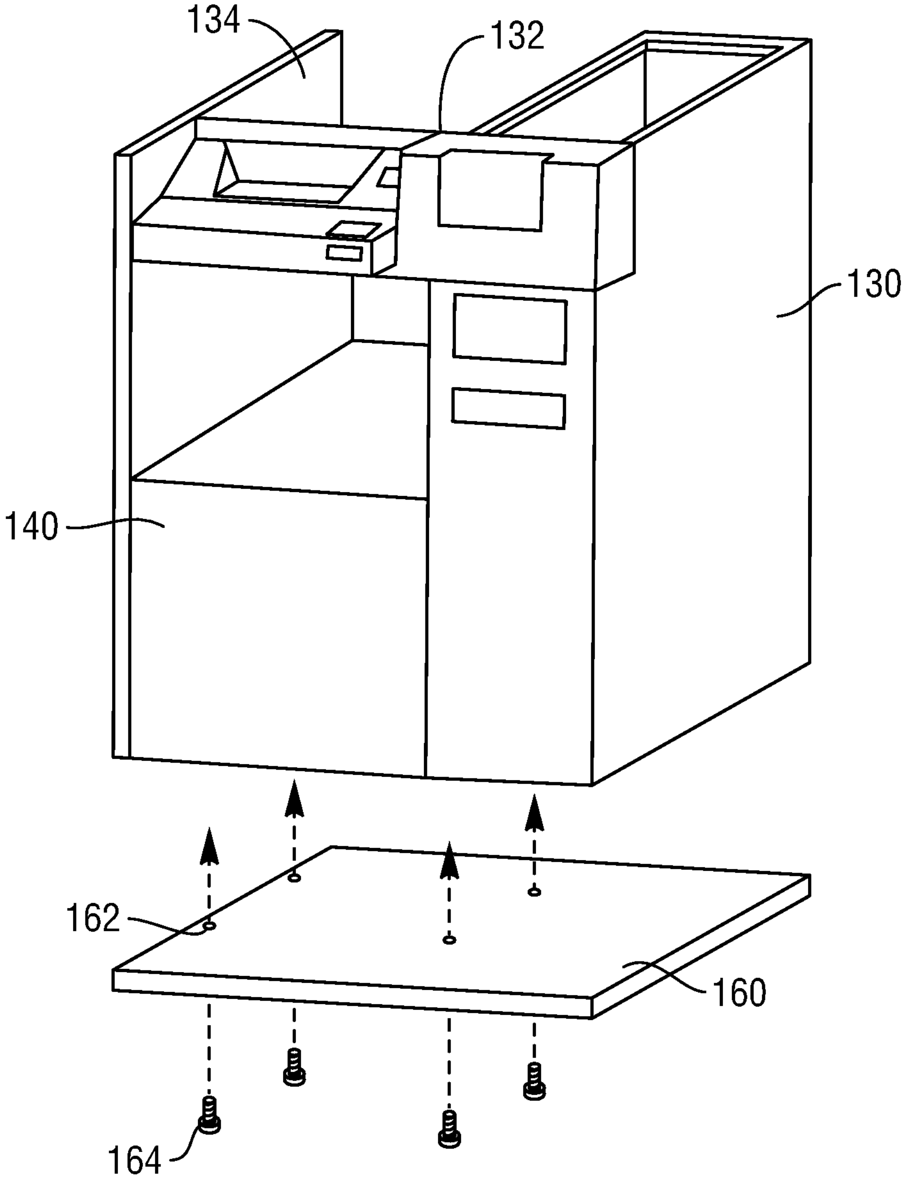
FIG. 2 is a partial view of the ATM of FIG. 1, and showing a structural support plate secured to bottom of the safe enclosure and bottom of the one sidecar.

Referring to FIG. 2, a partial view of ATM 100 of FIG. 1 with parts removed is illustrated. Parts are removed to show a safe enclosure 140 located in safe enclosure housing 112, a frame part 130 of sidecar 114, and a frame part 132 for supporting user interface 102 and screen 118, and a sidewall 134. Each of frame part 130 and frame part 132 typically comprises sheet metal material. Safe enclosure 140 typically comprises heavy-duty metal material, such as cast iron, for example. Safe enclosure 140 generally houses ATM modules which require a relatively higher security level. Sidecar 114 generally houses ATM modules which require a relatively lower security level.

As shown in FIG. 2, example structural support plate 160 includes a plurality of openings 162 through which a corresponding plurality of threaded bolts 164 can be fastened to bottom of safe enclosure 140. The pattern of openings 162, as shown in FIG. 2, is only an example pattern. It is conceivable that other opening patterns, or any combination of opening patterns, may be used. Support plate 160 has a size which covers substantially the entire bottom area of safe enclosure 140 and substantially the entire bottom area of sidecar 114.

The plurality of threaded bolts 164 may be fastened at any combination of a number of different locations on bottom of safe enclosure 140. For example, each of threaded bolts 164 may be fastened in a tapped hole which extends through bottom of safe enclosure 140. In this example, each of threaded bolts 164 would protrude slightly into interior of safe enclosure 140. In the case of bottom of safe enclosure 140 being made of concrete material, threaded inserts would be used.

As another example, each of threaded bolts 164 may be fastened in a tapped hole which does not extend through bottom of safe enclosure 140. In this example, the tapped hole may be at any combination of a number of different locations on bottom of safe enclosure 140. For examples, the tapped hole may be at a bottom wall location which is in vertical alignment with an exterior sidewall of safe enclosure 140, or at a bottom wall location which is in vertical alignment with an interior wall of enclosure 140, or at a bottom wall location which is a reinforced bottom wall portion of safe enclosure 140. In the case of bottom of safe enclosure 140 being made of concrete material, threaded inserts would be used.

Support plate 160 may comprise material made of aluminum, for example. As another example, material of support plate 160 may be made of steel. Other types of materials or combinations of materials are possible. Thickness of support plate 160 depends upon the material of support plate 160 and the specified weight it needs to support. Material and thickness of the material of support plate 160 are selected such that support plate 160 is sufficiently strong enough to support the ATM 100 including safe enclosure 140 and sidecar 114 without bending.

Figure 3:
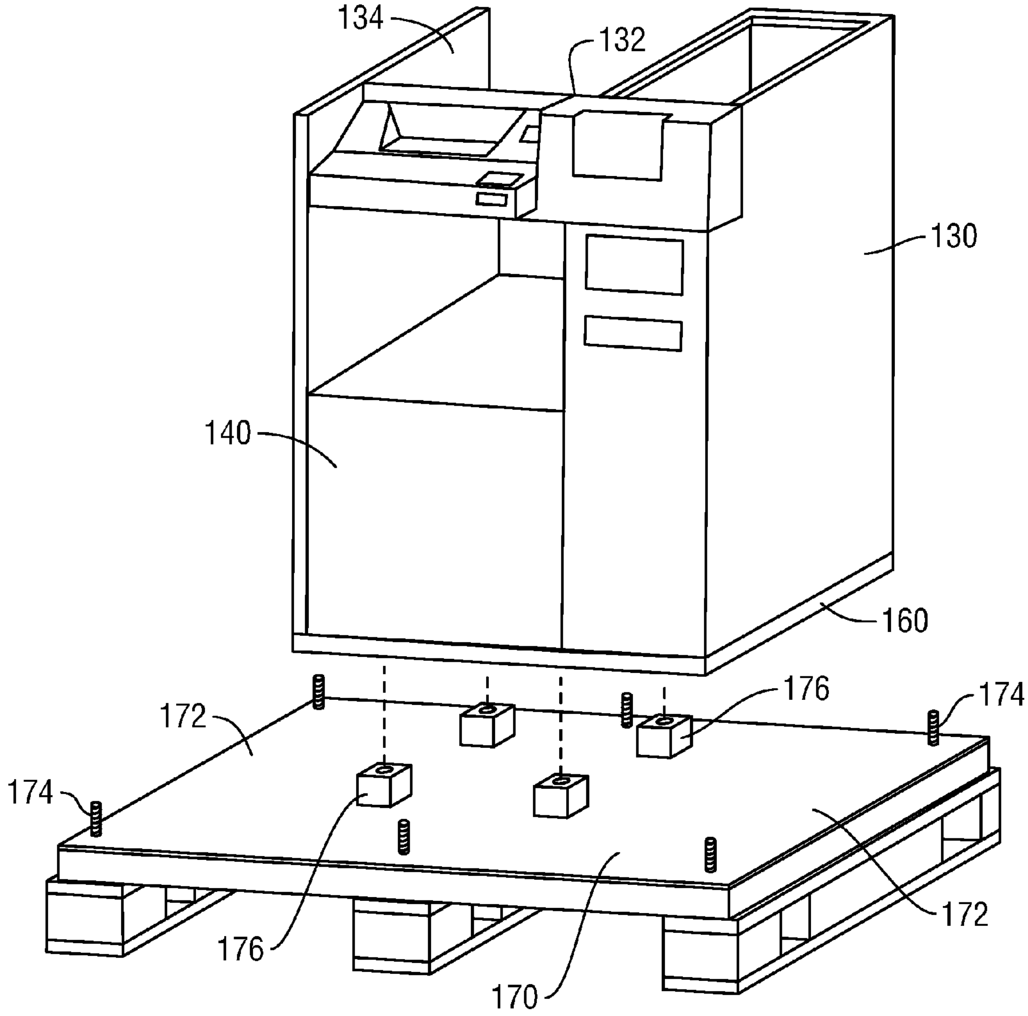
FIG. 3 is a view similar to FIG. 2, and showing a forklift pallet under the structural support plate.

Referring to FIG. 3, a fork of a forklift truck (not shown) lifts ATM 100 having sidecar 114 (FIG. 1) and places the ATM unit onto a forklift pallet 170. Pallet 170 includes a flat surface 172 and a number of jackscrews 174 which extend through flat surface 172. Structure and operation of jackscrews used in forklift pallets are known.

Pallet 170 further includes a number of cushion pads 176 which are disposed on flat surface 172. Cushion pads 176 may comprise wooden blocks made out of either oriented strand board or plywood. Each of cushion pads 176 may have a height of about 54 mm, for example. Cushion pads 176 are positioned relative to each other such that they are aligned with the plurality of threaded bolts 164 (FIG. 2) which are fastened through support plate 160 to bottom of safe enclosure 140. Cushion pads 176 protect the plurality threaded bolts 164 when the ATM unit is placed on pallet 170. Pallet 170 has known standard construction and, therefore, will not be further described.

Figure 4:
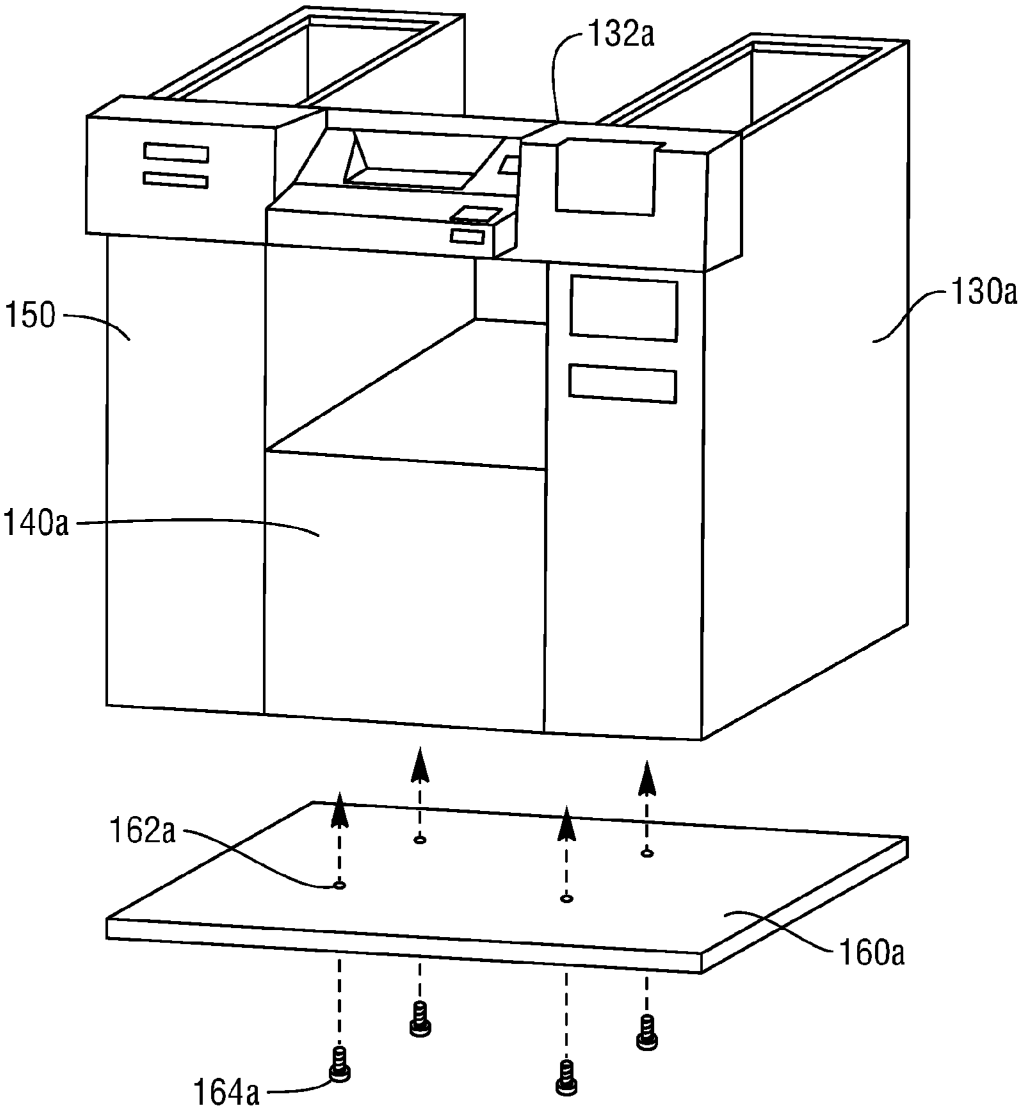
FIG. 4 is a partial view of an ATM having a safe enclosure and two sidecars, and showing a structural support plate secured to bottom of the safe enclosure and bottom of each of the sidecars.
Figure 5:
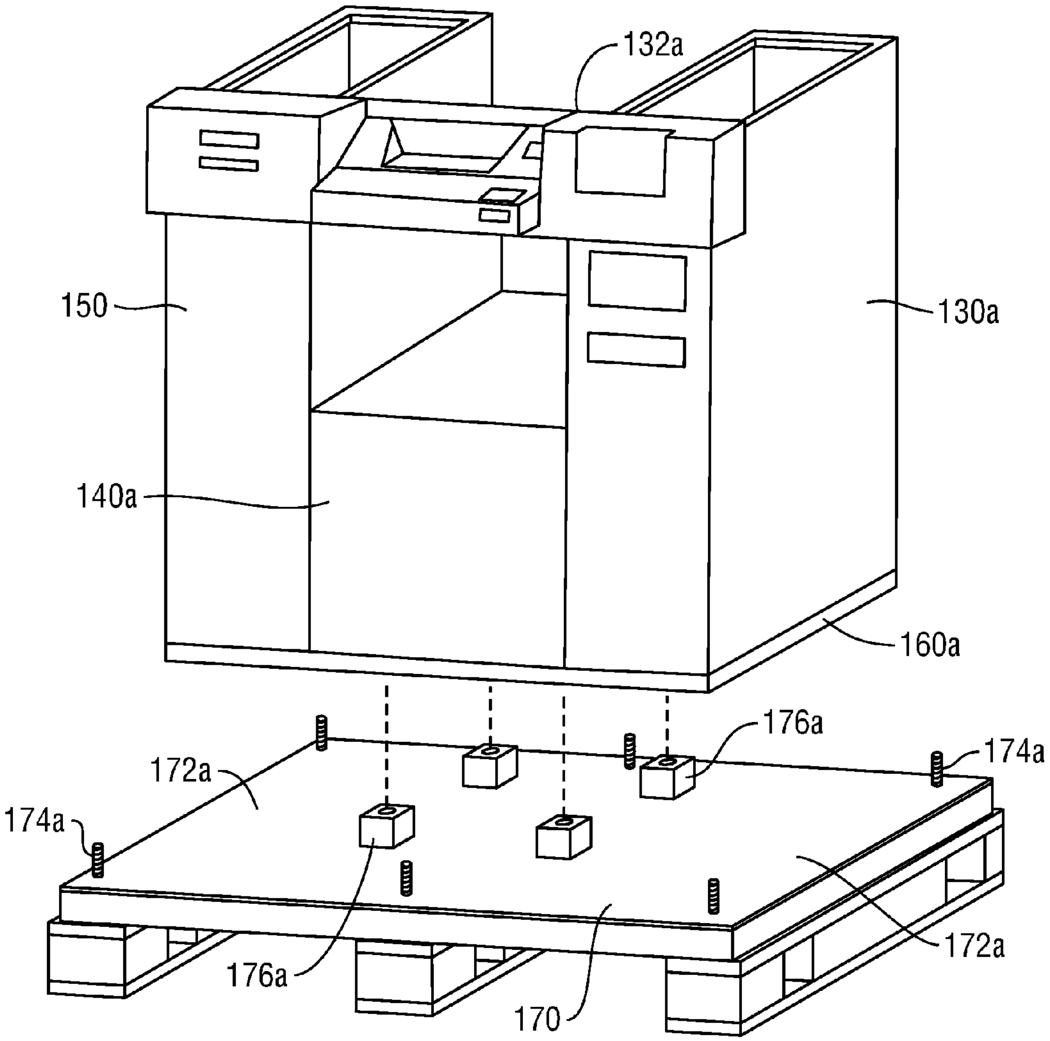
FIG. 5 is a view similar to FIG. 4, and showing a forklift pallet under the structural support plate.

Another embodiment is illustrated in FIGS. 4 and 5. Since the embodiment illustrated in FIGS. 4 and 5 is generally similar to the embodiment illustrated in FIGS. 1-3, similar numerals are utilized to designate similar components, the suffix letter "a" being associated with the embodiment of FIGS. 4 and 5 to avoid confusion.

As shown in FIG. 4, a partial view of an ATM having two sidecars with parts removed is illustrated. Parts are removed to show a safe enclosure 140*a*, a frame part 130*a* of a first sidecar, a frame part 150 of a second sidecar, and a frame part 132*a* for supporting a user interface and screen (both not shown). Each of frame part 130*a*, frame part 150, and frame part 132*a* typically comprises sheet metal material. Safe enclosure 140*a* typically comprises heavy-duty metal material, such as cast iron, for example.

Example structural support plate 160*a* includes a plurality of openings 162*a* through which a corresponding plurality of threaded bolts 164*a* can be fastened to bottom of safe enclosure 140*a*. The pattern of openings 162*a*, as shown in FIG. 4, is only an example pattern. It is conceivable that other opening patterns, or any combination of opening patterns, may be used. Support plate 160*a* has a size which covers substantially the entire bottom area of safe enclosure 140*a* and substantially the entire bottoms of both sidecars.

The plurality of threaded bolts 164*a* may be fastened at any combination of a number of different locations on bottom of safe enclosure 140*a*. For example, each of threaded bolts 164*a* may be fastened in a tapped hole which extends through bottom of safe enclosure 140*a*. In this example, each of threaded bolts 164*a* would protrude slightly into interior of safe enclosure 140*a*. In the case of bottom of safe enclosure 140*a* being made of concrete material, threaded inserts would be used.

As another example, each of threaded bolts 164*a* may be fastened in a tapped hole which does not extend through bottom of safe enclosure 140*a*. In this example, the tapped hole may be at any combination of a number of different locations on bottom of safe enclosure 140*a*. For examples, the tapped hole may be at a bottom wall location which is in vertical alignment with an exterior sidewall of safe enclosure 140*a*, or at a bottom wall location which is in vertical alignment with an interior wall of enclosure 140*a*, or at a bottom wall location which is a reinforced bottom wall portion of safe enclosure 140*a*. In the case of bottom of safe enclosure 140*a* being made of concrete material, threaded inserts would be used.

Support plate 160*a* may comprise material made of aluminum, for example. As another example, material of support plate 160*a* may be made of steel. Other types of materials or combinations of materials are possible. Thickness of support plate 160*a* depends upon the material of support plate 160*a* and the specified weight it needs to support. Material and thickness of the material of support plate 160*a* are selected such that support plate 160*a* is sufficiently strong enough to support the ATM including safe enclosure 140*a* and sidecar 114*a* without bending.

As shown in FIG. 5, a fork of a forklift truck (not shown) lifts the ATM having the two sidecars and places the ATM unit onto a forklift pallet 170*a*. Pallet 170*a* includes a flat surface 172*a* and a number of jackscrews 174*a* which extends through flat surface 172*a*. Structure and operation of jackscrews used in forklift pallets are known.

Pallet 170*a* further includes a number of cushion pads 176*a* which are disposed on flat surface 172*a*. Cushion pads 176*a* may comprise wooden blocks made out of either oriented strand board or plywood. Each of cushion pads 176*a* may have a height of about 54 mm, for example. Cushion pads 176*a* are positioned relative to each other such that they are aligned with the plurality of threaded bolts 164*a* (FIG. 4) which are fastened to bottom of safe enclosure 140*a*. Cushion pads 176*a* protect the plurality threaded bolts 164*a* when the ATM unit is placed on pallet 170*a*. Pallet 170*a* has known standard construction and, therefore, will not be further described.

As is known, ATM units which have relatively smaller safe enclosures may have larger footprints and may be bulkier than ATM units which have relatively larger safe enclosures. With their larger and bulkier footprints, the ATM units with relatively smaller safe enclosures have more limited access to lifting by a forklift truck. A support plate, such as support plate 160, 160*a* described hereinabove, provides a relatively larger surface area against which a fork of a forklift truck can be applied to lift the ATM unit and place the ATM unit onto pallet 170, 170*a*. Support plate 160, 160*a* effectively provides additional lifting areas other than that of safe enclosure 140, 140*a* for lifting the ATM unit. Accordingly, support plate 160, 160*a* provides the structural rigidity and strength to allow these ATM units with relatively smaller safe enclosures to be more easily accessed by a forklift truck for lifting, moving, and installing thereof.

It should be apparent that support plate 160, 160*a* provides an ATM having at least one sidecar with sufficient rigidity and strength such that the ATM unit can be lifted with a forklift truck from any side of the ATM unit without applying force to a sidecar. Forces applied to support plate 160, 160*a* in area of a sidecar are transferred to safe enclosure 140, 140*a*. Support plate 160, 160*a* reduces risk of a fork of a forklift truck damaging a sidecar when the forklift truck approaches the ATM unit from the side of a sidecar. Accordingly, support plate 160, 160*a* prevents damage to a sidecar as the ATM unit is lifted, moved, and installed.

Although the above description describes structural support plate 160, 160*a* as having all of the above-described features, it is conceivable that the may have any combination of the features. It is also conceivable that the above-described structural support plate 160, 160*a* be provided in an ATM having at least one sidecar of any style and size.

Also, although the above description describes support plate 160, 160*a* as having a size which covers substantially the entire bottom one or more sidecars, it is conceivable that support plate 160, 160*a* may have a size in which outer edges of support plate 160, 160*a* are recessed from outer edges of a sidecar by only a small amount. By recessing outer edges of support plate 160, 160*a* from outer edges of a sidecar by a small amount, support plate 160, 160*a* may not be visible to an ATM customer using the ATM unit to conduct an ATM transaction.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An automated teller machine (ATM) comprising:

a safe enclosure in which ATM modules which require a relatively higher security level are housed;

a first standard enclosure housing attached to a first side of the safe enclosure, and in which ATM modules which require a relatively lower security level are housed; and a support plate permanently secured to bottom of the safe enclosure and to bottom of the first standard enclosure housing to structurally support both the safe enclosure and the first standard enclosure housing as a unit when the ATM is lifted and placed on a pallet to allow the ATM to be lifted from under a support plate side of the support plate that corresponds to the first standard enclosure housing while preventing damage to the first standard enclosure housing during lifting, and wherein the support plate having sufficient rigidity and strength to permit ATM to be lifted from any side of the ATM, and wherein outer edges of the support plate are recessed from outer edges of the first standard enclosure, wherein the support plate substantially covers an entire bottom of the safe enclosure, and wherein the support plate has a plurality of openings through which a corresponding plurality of threaded bolts are fastened to bottom of the safe enclosure through an underside of the support plate into the safe enclosure, and wherein pallet is adapted to be placed under the support plate and the pallet including pads, each pad situated on a top and flat surface of the pallet to align under and correspond with an end of a corresponding threaded bolt, wherein each pad is a wooden block that protects the end of the corresponding threaded bolt when the pallet is placed under the support plate.

2. An ATM according to claim 1, wherein the support plate covers substantially the entire bottom of the safe enclosure and substantially the entire bottom of the first standard enclosure housing when the support plate is secured to the bottom of the safe enclosure and the bottom of the first standard enclosure housing.

3. An ATM according to claim 1, further comprising a second standard enclosure housing attached to a second side of the safe enclosure which is opposite the first side of the safe enclosure, and in which ATM modules which require a relatively lower security level are housed.

4. An ATM according to claim 3, wherein the support plate is permanently secured to bottom of the second standard enclosure housing to structurally support the second standard enclosure housing as a unit together with the safe enclosure and the first standard enclosure housing when the ATM is lifted and preventing damage to the second standard enclosure housing during lifting.

5. An ATM according to claim 4, wherein the support plate covers substantially the entire bottom of the safe enclosure, substantially the entire bottom of the first standard enclosure housing, and substantially the entire bottom of the second standard enclosure housing when the support plate is secured to the bottom of the safe enclosure, the bottom of the first standard enclosure housing, and the bottom of the second standard enclosure housing.

6. A method of supporting an automated teller machine (ATM) having a safe enclosure and a first standard enclosure housing, the method comprising:

supporting bottom of the safe enclosure and bottom of the first standard enclosure housing with a single structural support plate which is permanently secured to bottom of the safe enclosure to provide rigidity and strength to the safe enclosure and the first standard enclosure housing and thereby to enable the first standard enclosure housing to be lifted together with the safe enclosure as a unit when the ATM is lifted and placed on a pallet by a forklift through the single structural support plate, and wherein the single structural support plate having sufficient rigidity and strength to permit ATM to be lifted from any side of the ATM, and wherein outer edges of the single structural support plate are recessed from outer edges of the first standard enclosure and wherein the single structural support plate substantially covers an entire bottom of the safe enclosure, and wherein a top and flat surface of the pallet includes pads that corresponded to threaded bolts on an underside of the support plate, each threaded bolt affixed through holes of the underside of the support plate into the safe enclosure, and each pad aligned on the top and flat surface of the pallet under an end of a corresponding threaded bolt, each pad is a wooden block that protects the end of the corresponding threaded bolt when the pallet is placed under the support plate.

7. A method according to claim 6, further comprising:

supporting bottom of a second standard enclosure housing with the single structural support plate to provide rigidity and strength thereto and thereby to enable the second standard enclosure housing to be lifted together with the first standard enclosure housing and the safe enclosure as a unit when the ATM is lifted by a forklift.

8. An automated teller machine (ATM) comprising:

a safe enclosure in which ATM modules which require a relatively higher security level are housed;

a first standard enclosure housing attached to a first side of the safe enclosure, and in which ATM modules which require a relatively lower security level are housed;

a second standard enclosure housing attached to a second side of the safe enclosure which is opposite the first side of the safe enclosure, and in which ATM modules which require a relatively lower security level are housed;

a support plate permanently secured to bottom of the safe enclosure, bottom of the first standard enclosure housing, and bottom of the second standard enclosure housing to structurally support the safe enclosure and the first and second standard enclosure housings as a unit when the ATM is lifted from under any side of the support plate that corresponds to the first and second standard enclosure housings, and preventing damage to the first and second standard enclosure housings during lifting, and wherein the support plate having sufficient rigidity and strength to permit ATM to be lifted from any side of the ATM, and wherein outer edges of the support plate are recessed from outer edges of the first standard enclosure and wherein the support plate substantially covers an entire bottom of the safe enclosure, and wherein the support plate has a plurality of openings through which a corresponding plurality of threaded bolts are fastened to bottom of the safe enclosure through an underside of the support plate and into the safe enclosure, wherein a pallet is adapted to be placed under the support plate and the pallet including a top and flat surface having pads that are wooden blocks situated on the top and flat surface of the pallet, each pad situated to correspond under an end of a corresponding threaded bolt to protect the end of the corresponding threaded bolt when the pallet is placed under the support plate.

9. An ATM according to claim 8, wherein the support plate covers substantially the entire bottom of the safe enclosure, substantially the entire bottom of the first standard enclosure housing, and substantially the entire bottom of the second standard enclosure housing when the support plate is secured to the bottom of the safe enclosure, the bottom of the first standard enclosure housing, and the bottom of the second standard enclosure housing.

10. An automated teller machine (ATM) comprising:

a safe enclosure;

a second enclosure attached to a particular side of the safe enclosure;

a support plate permanently secured to a bottom of the safe enclosure and to a bottom of the second enclosure, the support plate adapted to be lifted from under a support plate side of the support plate that corresponds to the second enclosure during lifting of the ATM onto a pallet, and wherein the support plate having sufficient rigidity and strength to permit ATM to be lifted from any side of the ATM, and wherein outer edges of the support plate are recessed from outer edges of the second enclosure attached to the particular side of the safe enclosure and wherein the support plate substantially covers an entire bottom of the safe enclosure, and wherein the support plate has a plurality of openings through which a corresponding plurality of threaded bolts can be fastened through an underside of the support plate into the safe enclosure, wherein the pallet adapted to be placed under the support plate and the pallet including a top flat surface having pads, each pad corresponding to one of the threaded bolts and aligned under an end of a corresponding threaded bolt to protect the end of the corresponding threaded bolt when the pallet is placed under the support plate, and wherein each pad is a wooden block.

* * * * *